(12) United States Patent
Koga et al.

(10) Patent No.: US 12,631,363 B2
(45) Date of Patent: May 19, 2026

(54) AIRFLOW CONTROL SYSTEM AND AIRFLOW CONTROL METHOD

(71) Applicant: Panasonic Intellectual Property Management Co., Ltd., Osaka (JP)

(72) Inventors: Tatsuo Koga, Osaka (JP); Jin Yoshizawa, Osaka (JP); Kazuto Ura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 377 days.

(21) Appl. No.: 18/573,468

(22) PCT Filed: Jun. 17, 2022

(86) PCT No.: PCT/JP2022/024390
§ 371 (c)(1),
(2) Date: Dec. 22, 2023

(87) PCT Pub. No.: WO2023/276735
PCT Pub. Date: Jan. 5, 2023

(65) Prior Publication Data
US 2024/0295338 A1     Sep. 5, 2024

(30) Foreign Application Priority Data

Jun. 30, 2021     (JP) ................................. 2021-108428

(51) Int. Cl.
*F24F 11/00*          (2018.01)
*F24F 11/72*          (2018.01)
(Continued)

(52) U.S. Cl.
CPC .............. *F24F 11/72* (2018.01); *G06V 40/25* (2022.01); *F24F 2120/14* (2018.01)

(58) Field of Classification Search
CPC .......... F24F 11/72; G06V 40/20; G06V 40/25
See application file for complete search history.

(56) References Cited

U.S. PATENT DOCUMENTS 11,512,866  B2 * 11/2022  Umekage .............. F24F 1/0047
2008/0254734  A1 * 10/2008  Uenaka .................. F24F 1/0011
454/256

(Continued)

FOREIGN PATENT DOCUMENTS

AU          2005-206673  A1     8/2005
CN          108592186  A     9/2018
(Continued)

OTHER PUBLICATIONS

International Search Report for corresponding Application No. PCT/JP2022/024390, mailed Aug. 30, 2022.
(Continued)

*Primary Examiner* — Mark A Connolly
(74) *Attorney, Agent, or Firm* — Renner, Otto, Boisselle & Sklar, LLP

(57)          ABSTRACT

An airflow control system (10) includes: an obtainer (34) that obtains image data of an interior space (50) in which an airflow is formed by an airflow generation device (40) and a person is located; an identifier (35) that identifies skeletal coordinates of the person based on the image data obtained; an estimator (36) that estimates a movement of the person based on time-series data of the skeletal coordinates identified; and a controller (37) that controls the airflow generation device (40) to suppress a disturbance of the airflow caused by the movement of the person estimated.

7 Claims, 6 Drawing Sheets

(51) Int. Cl.
_G06V 40/20_ (2022.01)
_F24F 120/14_ (2018.01)

(56) References Cited

U.S. PATENT DOCUMENTS

| | | | |
|---|---|---|---|
| 2016/0363340 A1 | 12/2016 | Shikii et al. | |
| 2020/0273200 A1* | 8/2020 | Ellwein ..................... | G06T 7/73 |
| 2021/0215377 A1 | 7/2021 | Kitagawa et al. | |
| 2021/0347231 A1* | 11/2021 | Pihlsgård ............. | B60H 1/3414 |

FOREIGN PATENT DOCUMENTS

| | | | | |
|---|---|---|---|---|
| JP | 06-101880 A | 4/1994 | | |
| JP | 2017-72355 A | 4/2017 | | |
| JP | 2017-219247 A | 12/2017 | | |
| JP | 2020-038052 A | 3/2020 | | |
| WO | WO-2008066311 A1 * | 6/2008 | ............. | F24F 11/79 |
| WO | 2021/039642 A1 | 3/2021 | | |

OTHER PUBLICATIONS

Written Opinion for corresponding Application No. PCT/JP2022/024390, mailed Aug. 30, 2022.
Extended European Search Report dated Sep. 24, 2024 in corresponding European Patent Application 22832885.2.

* cited by examiner

FIG. 10

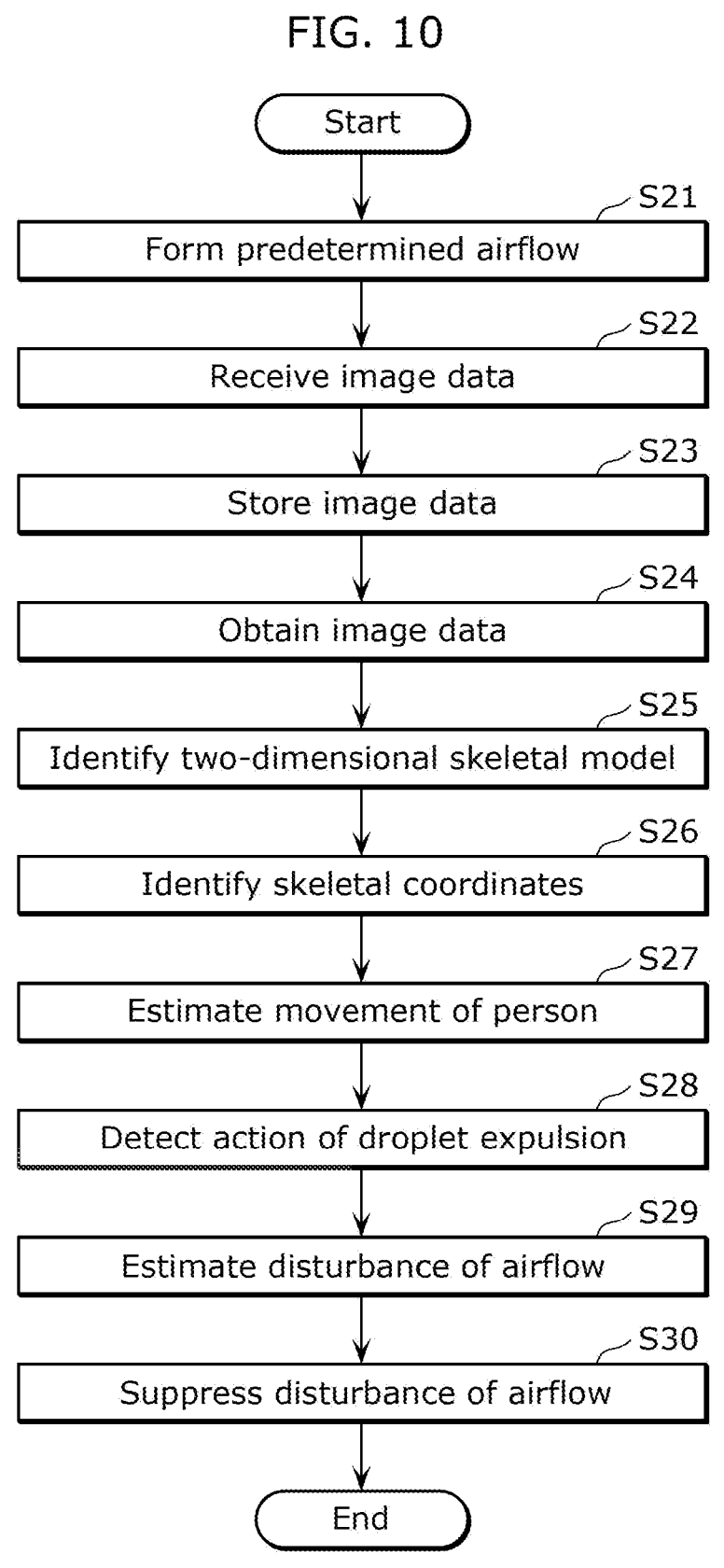

```
        ┌─────────────┐
        │    Start    │
        └─────────────┘
               │
               ▼                          ⌒S21
┌──────────────────────────────────┐
│     Form predetermined airflow    │
└──────────────────────────────────┘
               │
               ▼                          ⌒S22
┌──────────────────────────────────┐
│        Receive image data         │
└──────────────────────────────────┘
               │
               ▼                          ⌒S23
┌──────────────────────────────────┐
│         Store image data          │
└──────────────────────────────────┘
               │
               ▼                          ⌒S24
┌──────────────────────────────────┐
│         Obtain image data         │
└──────────────────────────────────┘
               │
               ▼                          ⌒S25
┌──────────────────────────────────┐
│  Identify two-dimensional skeletal model │
└──────────────────────────────────┘
               │
               ▼                          ⌒S26
┌──────────────────────────────────┐
│      Identify skeletal coordinates │
└──────────────────────────────────┘
               │
               ▼                          ⌒S27
┌──────────────────────────────────┐
│      Estimate movement of person  │
└──────────────────────────────────┘
               │
               ▼                          ⌒S28
┌──────────────────────────────────┐
│    Detect action of droplet expulsion │
└──────────────────────────────────┘
               │
               ▼                          ⌒S29
┌──────────────────────────────────┐
│    Estimate disturbance of airflow │
└──────────────────────────────────┘
               │
               ▼                          ⌒S30
┌──────────────────────────────────┐
│    Suppress disturbance of airflow │
└──────────────────────────────────┘
               │
               ▼
        ┌─────────────┐
        │     End     │
        └─────────────┘
```

AIRFLOW CONTROL SYSTEM AND AIRFLOW CONTROL METHOD

TECHNICAL FIELD

The present invention relates to an airflow control system and an airflow control method.

BACKGROUND ART

Various technologies have been proposed, for example, for ventilation or air conditioning of interior spaces. Patent Literature (PTL) 1 discloses an air conditioner control device that provides an air-conditioning environment that takes human gestures into consideration.

CITATION LIST

Patent Literature

[PTL 1]
Japanese Unexamined Patent Application Publication No. 2017-219247

SUMMARY OF INVENTION

Technical Problem

The present invention provides an airflow control system and an airflow control method capable of maintaining an airflow formed in an interior space.

Solution to Problem

An airflow control system according to one aspect of the present invention includes: an obtainer that obtains image data of an interior space in which an airflow is formed by an airflow generation device and a person is located; an identifier that identifies skeletal coordinates of the person, based on the image data obtained; an estimator that estimates a movement of the person based on time-series data of the skeletal coordinates identified; and a controller that controls the airflow generation device to suppress a disturbance of the airflow caused by the movement of the person estimated.

An airflow control method according to one aspect of the present invention includes: obtaining image data of an interior space in which an airflow is formed by an airflow generation device and a person is located; identifying skeletal coordinates of the person based on the image data obtained; estimating a movement of the person based on time-series data of the skeletal coordinates identified; and controlling the airflow generation device to suppress a disturbance of the airflow caused by the movement of the person estimated.

A recording medium according to one aspect of the present invention is a non-transitory computer-readable recording medium having recorded thereon a program for causing a computer to execute the airflow control method described above.

Advantageous Effects of Invention

The airflow control system and the airflow control method of the present invention can maintain an airflow formed in an interior space.

BRIEF DESCRIPTION OF DRAWINGS

FIG. 10 is a flowchart of Operation Example 2 of the airflow control system according to the embodiment.

DESCRIPTION OF EMBODIMENTS

Figure 1:
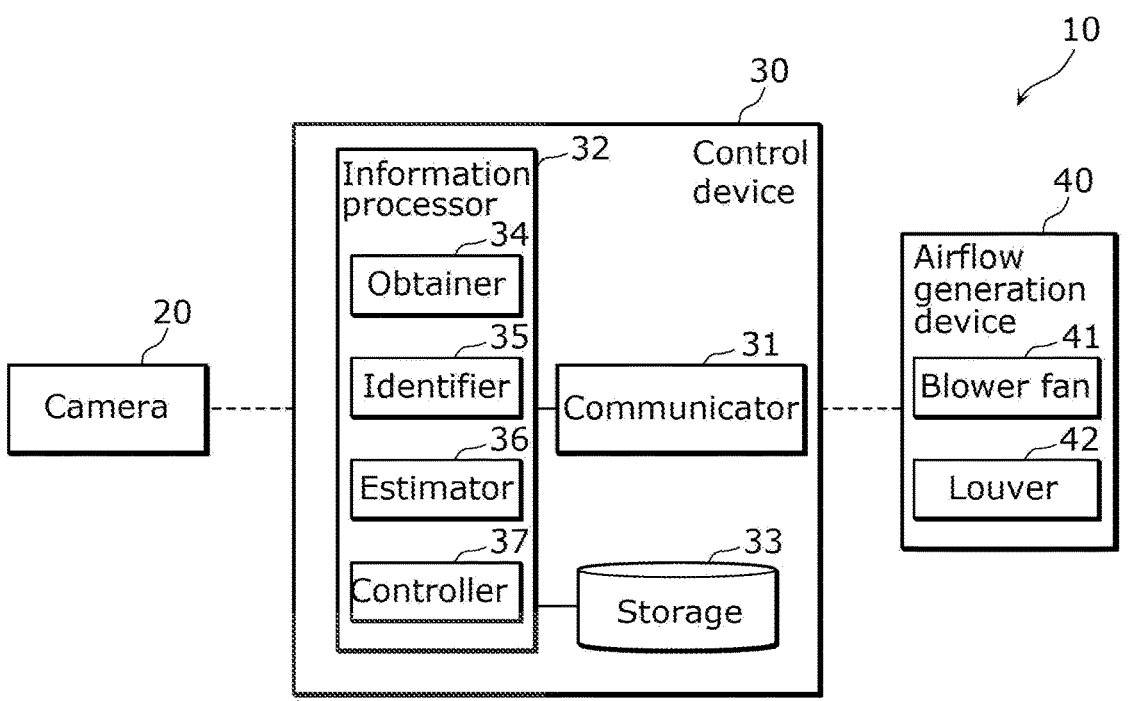
FIG. 1 is a block diagram illustrating a functional configuration of an airflow control system according to an embodiment.

Hereinafter, certain exemplary embodiments are described with reference to the accompanying Drawings. Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the present invention. Among the elements in the following exemplary embodiments, those not recited in any one of the independent claims are described as optional elements.

Each figure is a schematic diagram and is not necessarily a rigorous illustration. Throughout the figures, substantially the same configurations are denoted by the same reference numerals, and redundant explanations may be omitted or simplified.

Embodiment

[Configuration]

Figure 2:
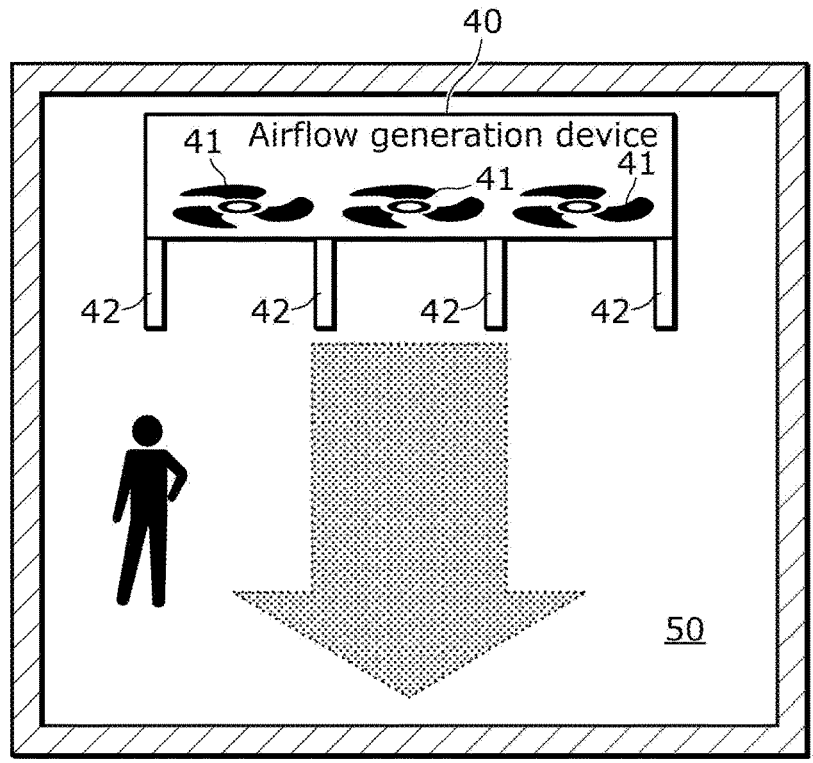
FIG. 2 is a diagram illustrating a general configuration of an airflow generation device included in the airflow control system according to the embodiment.

First, a configuration of an airflow control system according to an embodiment will be described. FIG. 1 is a block diagram illustrating a functional configuration of the airflow control system according to the embodiment. FIG. 2 is a diagram illustrating a general configuration of an airflow generation device included in the airflow control system according to the embodiment. Note that FIG. 2 shows a view of interior space 50 seen from above.

Airflow control system 10 is a system that obtains image data of interior space 50 outputted by camera 20 and controls an airflow (illustrated schematically by an arrow in FIG. 2) of interior space 50 based on the obtained image data. Interior space 50 is, for example, an office space, but may also be an interior space in other facilities such as a space in a commercial facility or a residential space. As shown in FIGS. 1 and 2, airflow control system 10 includes camera 20, control device 30, and airflow generation device 40.

Camera 20 is installed, for example, on a ceiling or a wall of interior space 50 and captures an image (a moving image including a plurality of images) that includes, as a subject, a person located in interior space 50. Camera 20 also transmits image data of the captured image to control device 30. Camera 20 may be a camera using a complementary metal oxide semiconductor (CMOS) image sensor or a camera using a charge coupled device (CCD) image sensor.

Camera 20 may be a camera using an image sensor capable of detecting infrared rays (infrared light). In other words, camera 20 may be an infrared camera. This allows camera 20 to capture images (infrared images) even when interior space 50 is dark.

Airflow control system 10 may include two or more cameras 20. For example, when an image captured by one camera 20 shows only a part of the body of a person, it is difficult to estimate skeletal coordinates (described later) of the entire body of the person. In such a case, estimator 36 can estimate skeletal coordinates from each of two images captured by two cameras 20 and synthesize the estimated skeletal coordinates to generate a three-dimensional skeletal model of the entire body of the person.

Control device 30 receives the image data from camera 20 and controls airflow generation device 40 based on the received image data. Control device 30 is, for example, a local controller (i.e., an edge computer) installed in the same facility where interior space 50 is provided, but may also be a server device (i.e., a cloud computer) installed outside the facility. Control device 30 includes communicator 31, information processor 32, and storage 33.

Communicator 31 is a communication module (communication circuit) used by control device 30 to communicate with camera 20 and airflow generation device 40. Communicator 31, for example, receives the image data from camera 20 and transmits a control signal to airflow generation device 40. The communication performed by communicator 31 may be wireless communication or wired communication. Any communication standard may be used for such communication.

Information processor 32 obtains the image data of the image received by communicator 31 and performs information processing to control airflow generation device 40 based on the obtained image data. Specifically, information processor 32 is implemented by a processor or a microcomputer. Information processor 32 includes obtainer 34, identifier 35, estimator 36, and controller 37. Functions of obtainer 34, identifier 35, estimator 36, and controller 37 are implemented by the processor or the microcomputer of information processor 32, executing computer programs stored in storage 33. Details of the functions of obtainer 34, identifier 35, estimator 36, and controller 37 will be described later.

Storage 33 is a storage device in which the image data received by communicator 31 and the computer programs to be executed by information processor 32, for example, are stored. Storage 33 also stores machine learning models and estimation models to be described later, for example. Specifically, storage 33 is implemented by a semiconductor memory or a hard disk drive (HDD), for example.

Airflow generation device 40 is installed in interior space 50 and forms an airflow in interior space 50. Airflow generation device 40 includes blower fan 41 and louver 42.

Blower fan 41 generates an airflow in interior space 50 by rotating. Airflow generation device 40 may include a plurality of blower fans 41. An air volume of blower fan 41 (i.e., the intensity of the airflow) is changed based on the control signal transmitted from control device 30.

Louver 42 is a structure for changing a direction of an airflow. In other words, louver 42 is a guide structure that guides an airflow.

Louver 42 is, for example, a blade-shaped structure whose orientation (angle of the blade) is changed based on the control signal transmitted by control device 30.

Airflow generation device 40 is, for example, a dedicated device for airflow control system 10. However, a ventilation device or an air conditioner, for example, preinstalled in interior space 50 may be utilized as airflow generation device 40.

Operation Example 1

Figure 3:
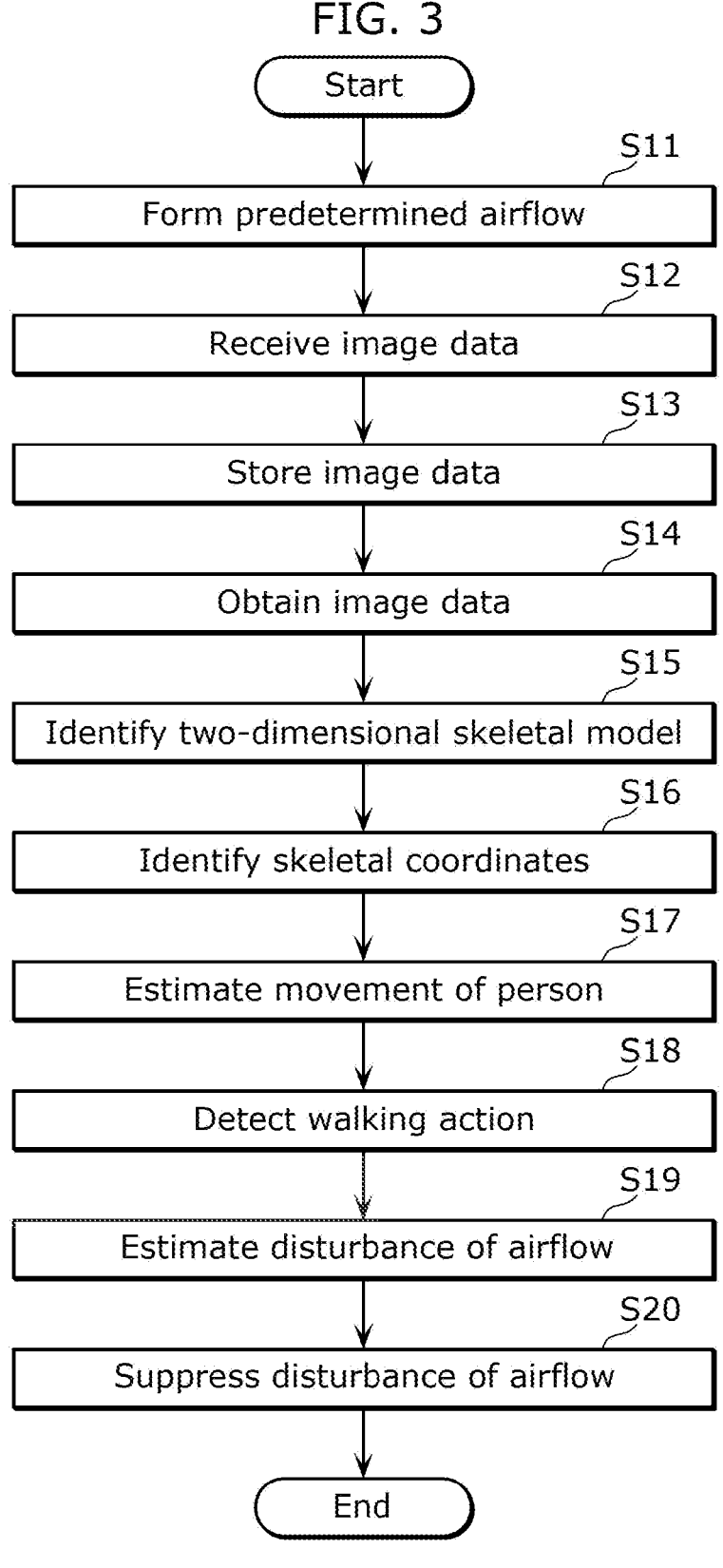
FIG. 3 is a flowchart of Operation Example 1 of the airflow control system according to the embodiment.

Operation Example 1 of airflow control system 10 will be described next. FIG. 3 is a flowchart of Operation Example 1 of airflow control system 10.

Controller 37 of control device 30 controls airflow generation device 40 to form a predetermined airflow (indicated by an arrow in FIG. 2) in interior space 50 (S11). The control of airflow generation device 40 is performed by transmitting a control signal from communicator 31 to airflow generation device 40. The predetermined airflow is obtained by controlling blower fan 41 and louver 42. A type of the predetermined airflow to be formed in interior space 50 is determined in advance by simulation, for example. This simulation is performed assuming that no person is present in interior space 50. When there is no external disturbance (no person) in interior space 50, the predetermined airflow is maintained.

Communicator 31 of control device 30 receives image data of an image of interior space 50 from camera 20 (S12). Information processor 32 stores the received image data in storage 33 (S13).

Figure 4:
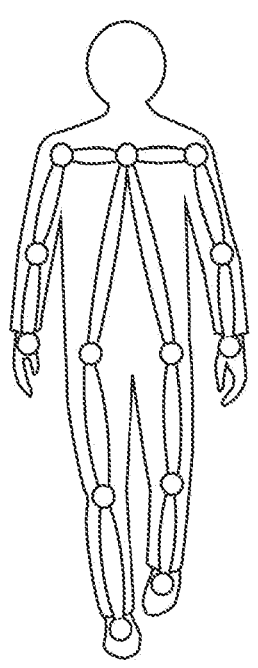
FIG. 4 is a diagram conceptually illustrating identification of a two-dimensional skeletal model of a person.

Next, obtainer 34 obtains the image data received by communicator 31 and stored in storage 33 (S14), and identifier 35 identifies a two-dimensional skeletal model of a person in the image based on the obtained image data (S15). FIG. 4 is a diagram conceptually illustrating the identification of the two-dimensional skeletal model of the person. As shown in FIG. 4, the two-dimensional skeletal model is a model in which joint positions (spheres) of the person in the image are connected by links (lines). An existing posture and skeleton identification algorithm is used to identify such a two-dimensional skeletal model.

Figure 5:
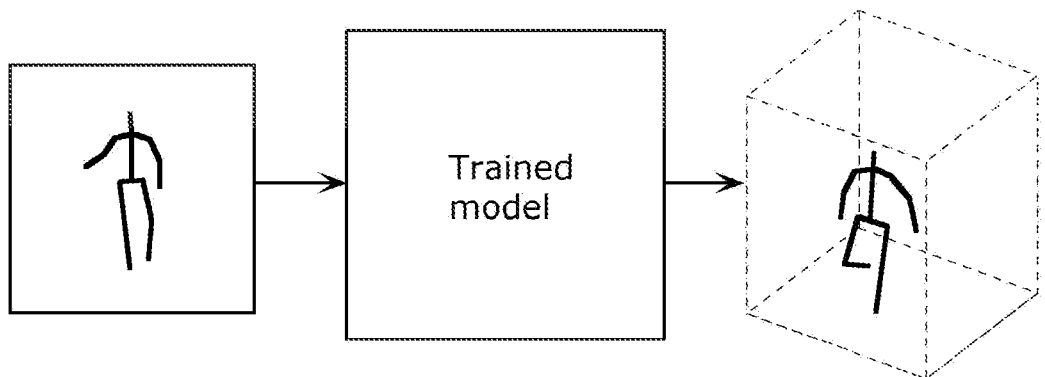
FIG. 5 is a diagram conceptually illustrating estimation of skeletal coordinates.

Next, identifier 35 identifies skeletal coordinates (three-dimensional coordinate data of the joints) from the identified two-dimensional skeletal model (S16). For example, identifier 35 identifies the skeletal coordinates using a machine learning model. FIG. 5 is a diagram conceptually illustrating estimation of the skeletal coordinates. This machine learning model is a trained model constructed in advance through machine learning using two-dimensional skeletal models with known skeletal coordinates of joints as training data and using the skeletal coordinates as labeled training data. Such a machine learning model can use, as an input, a two-dimensional skeletal model to output skeletal coordinates of the two-dimensional skeletal model (i.e., a three-dimensional skeletal model). By identifying skeletal coordinates for each of a plurality of images (frames) included in a moving image, identifier 35 can identify time-series data of the skeletal coordinates.

Next, estimator 36 estimates a movement of the person in the images from the identified time-series data of the skeletal coordinates (S17). Based on the estimation result, estimator 36 detects a walking action of the person (S18). The walking action is an example of a specific action. For example, if storage 33 stores a discrimination model that has been trained on joint movements when walking actions are performed, estimator 36 can detect a walking action by inputting the time-series data of the skeletal coordinates into the discrimination model.

For example, estimator 36 estimates a walking direction of the person based on the time-series data of the skeletal coordinates. In addition to the walking direction, estimator 36 may also estimate a walking speed and an amount of sway of the upper body during walking, for example.

Figure 6:
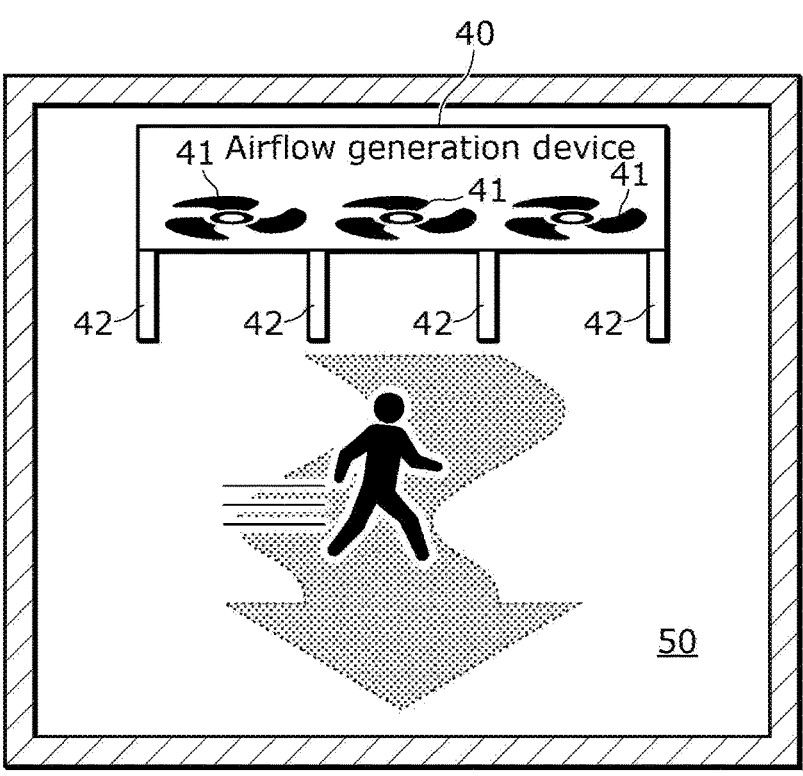
FIG. 6 is a diagram schematically illustrating a disturbance of an airflow in an interior space.

Next, estimator 36 estimates a disturbance of the airflow caused by the estimated action of the person (S19). As explained in step S11, the predetermined airflow formed in interior space 50 is based on the assumption that no person is present in interior space 50. Therefore, a movement of the person located in interior space 50 serves as an external disturbance. FIG. 6 is a diagram schematically illustrating a disturbance of the airflow in interior space 50.

Estimator 36 estimates the disturbance of the airflow caused by the walking action (S19). For example, estimator 36 estimates the disturbance of the airflow using a predetermined estimation model capable of estimating a disturbance of an airflow caused according to a relationship between a direction of the airflow and a walking direction of a person. The predetermined estimation model is, for example, prestored in storage 33.

The walking speed and the amount of sway of the upper body during walking may be further used to estimate the disturbance of the airflow. The disturbance of the airflow is estimated to be larger as the walking speed increases and as the amount of sway of the upper body during walking increases.

Figure 7:
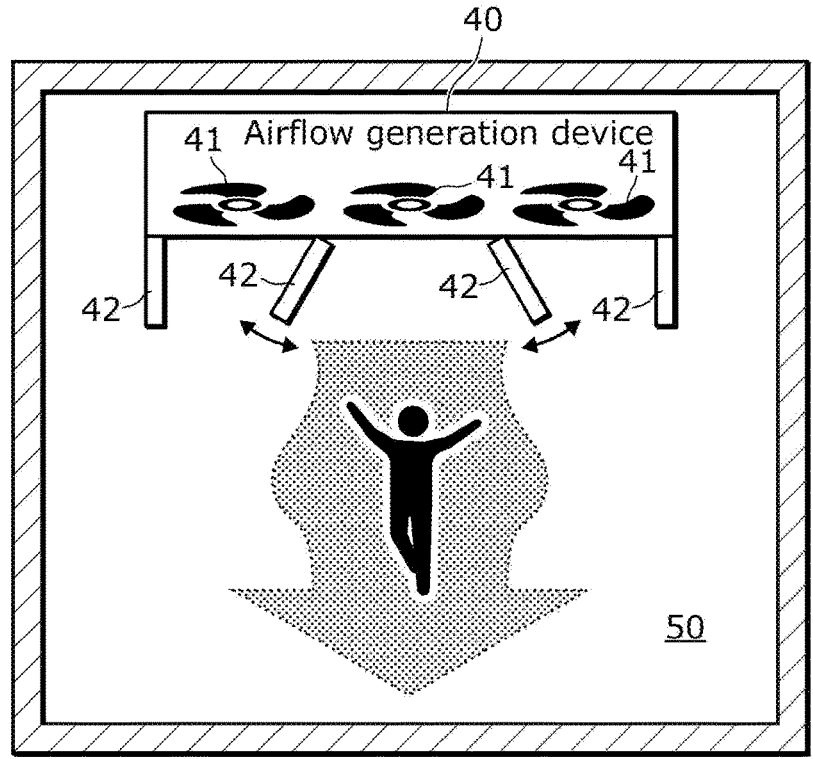
FIG. 7 is a diagram schematically illustrating the interior space after the disturbance of the airflow has been suppressed.

Next, controller 37 controls airflow generation device 40 to suppress the estimated disturbance of the airflow (S20). The control of airflow generation device 40 is performed by transmitting a control signal from communicator 31 to airflow generation device 40. FIG. 7 is a diagram schematically illustrating interior space 50 after the disturbance of the airflow has been suppressed.

Controller 37 operates airflow generation device 40 so that the estimated disturbance of the airflow is suppressed and thus the predetermined airflow (an airflow close to the predetermined airflow) is maintained by controlling, for example, an air volume of blower fan 41 and an orientation of louver 42. When airflow generation device 40 includes a plurality of blower fans 41, controller 37 may control air volume balance of the plurality of blower fans 41 to suppress the estimated disturbance of the airflow. The plurality of blower fans 41 may include auxiliary blower fan 41, which is normally stopped, for suppressing a disturbance of the airflow, and controller 37 may cause auxiliary blower fan 41 to generate an airflow (correction airflow) to suppress the estimated disturbance of the airflow. More simply, controller 37 may suppress the disturbance of the airflow by increasing the air volume of blower fan 41 when the walking action is detected.

As described above, airflow control system 10 can suppress the disturbance of the airflow in interior space 50 and can thus continuously form the airflow close to the predetermined airflow in interior space 50. Therefore, airflow control system 10 can suppress, for example, retention of dust or droplets in interior space 50.

[Variation of Airflow Generation Device]

Figure 8:
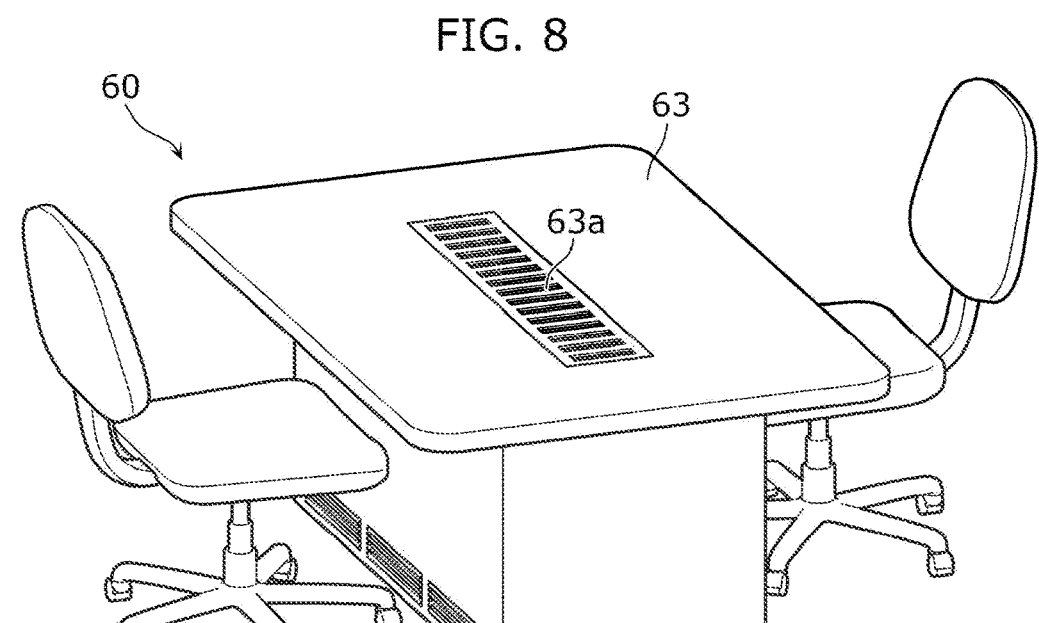
FIG. 8 is an external view of an airflow generation device according to a variation.
Figure 9:
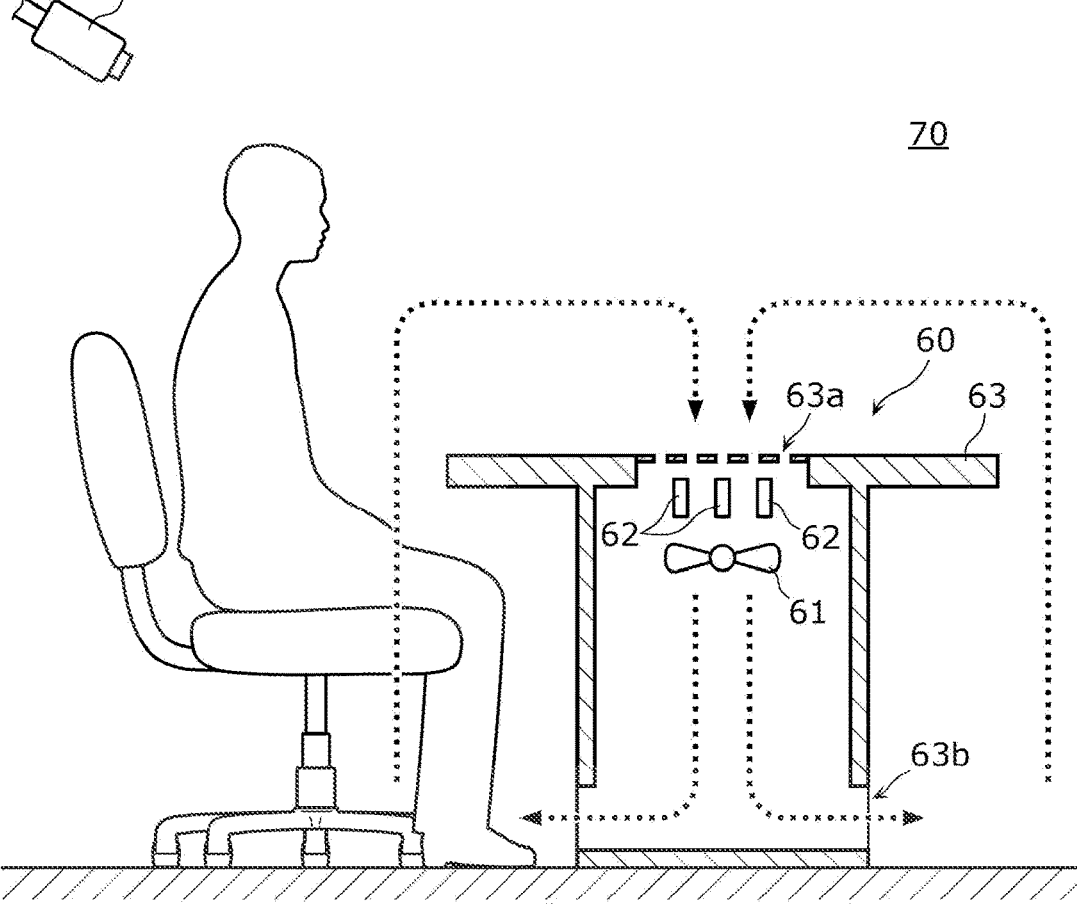
FIG. 9 is a diagram illustrating an internal structure of the airflow generation device according to the variation.

A configuration of an airflow generation device according to a variation, and Operation Example 2 of an airflow control system including such an airflow generation device will be described next. FIG. 8 is an external view of the airflow generation device according to the variation. FIG. 9 is a diagram illustrating an internal structure of the airflow generation device according to the variation.

As shown in FIGS. 8 and 9, airflow generation device 60 according to the variation is a desk-shaped device installed in interior space 70 such as a conference room. Airflow generation device 60 includes suction fan 61, louver 62, and main body 63. Airflow control system 10 (control device 30) may control such airflow generation device 60.

Suction fan 61 is housed in main body 63 and rotates to generate an airflow that draws air above main body 63 into main body 63 (an airflow from above to below). In other words, suction fan 61 draws in air in interior space 70. This allows airflow generation device 60 to suppress dispersion (soaring) of droplets generated in interior space 70 such as a conference room. Airflow generation device 60 may include a plurality of suction fans 61. A suction volume of suction fan 61 (i.e., the intensity of the airflow) is changed based on a control signal transmitted from control device 30.

Louver 62 is a structure for changing a direction of an airflow. For example, louver 62 is positioned above suction fan 61 inside main body 63. In other words, louver 62 is a guide structure that guides an airflow. Louver 62 is, for example, a blade-shaped structure whose orientation (angle of the blade) is changed based on the control signal transmitted by control device 30.

Main body 63 is a structure that houses suction fan 61 and louver 62 and that is also used as a desk by a person using the conference room. Suction port 63a is provided through a top face of main body 63 to draw air into main body 63 by suction fan 61. Discharge port 63b is provided below main body 63 (at the feet of the person) to discharge the air drawn in from suction port 63a. Discharge port 63b may be connected to a duct leading to the outside of interior space 70. In other words, the air may be discharged to the outside of interior space 70.

Airflow generation device 60 as described above can form an airflow that circulates air in interior space 70 by drawing in air above the desk and discharging the air from the port positioned at the feet of the person (indicated by arrows in FIG. 9).

Operation Example 2

Operations of airflow control system 10 including airflow generation device 60 as described above will be described below. FIG. 10 is a flowchart of Operation Example 2 of airflow control system 10.

Controller 37 of control device 30 controls airflow generation device 60 to form a predetermined airflow (indicated by arrows in FIG. 9) in interior space 70 (S21). Communicator 31 of control device 30 receives image data of an image of interior space 70 from camera 20 (S22). Information processor 32 stores the received image data in storage 33 (S23).

Next, obtainer 34 obtains the image data received by communicator 31 and stored in storage 33 (S24), and identifier 35 identifies a two-dimensional skeletal model of a person in the image based on the obtained image data (S25). Identifier 35 identifies skeletal coordinates (three-dimensional coordinate data of joints) from the identified two-dimensional skeletal model (S26). By identifying skeletal coordinates for each of a plurality of images (frames) included in a moving image, identifier 35 can identify time-series data of the skeletal coordinates. The operations of steps S21 to S26 described above are the same as those of steps S11 to S16 in Operation Example 1.

Next, estimator 36 estimates a movement of the person in the images from the identified time-series data of the skeletal coordinates (S27). Based on the estimation result, estimator 36 detects an action of droplet expulsion (such as sneezing or coughing) performed by the person (S28). The action of droplet expulsion is an example of a specific action. For example, if storage 33 stores a discrimination model that has been trained on joint movements when actions of droplet expulsion are performed, estimator 36 can detect an action of droplet expulsion by inputting the time-series data of the skeletal coordinates into the discrimination model.

Next, estimator 36 estimates a disturbance of the airflow caused by the action of droplet expulsion (S29). Estimator 36 estimates the disturbance of the airflow using, for example, a predetermined estimation model capable of estimating how the predetermined airflow is disturbed by the action of droplet expulsion. The predetermined estimation model is, for example, prestored in storage 33.

Next, controller 37 controls airflow generation device 60 to suppress the estimated disturbance of the airflow (S30). The control of airflow generation device 60 is performed by transmitting a control signal from communicator 31 to airflow generation device 60.

Controller 37 operates airflow generation device 60 so that the estimated disturbance of the airflow is suppressed and thus the predetermined airflow (an airflow close to the predetermined airflow) is maintained by controlling, for example, a suction volume of suction fan 61 and an orientation of louver 62. When airflow generation device 60 includes a plurality of suction fans 61, controller 37 may control suction balance of the plurality of suction fans 61 to suppress the estimated disturbance of the airflow. The plurality of suction fans 61 may include auxiliary suction fan 61, which is normally stopped, for suppressing a disturbance of the airflow, and controller 37 may cause auxiliary suction fan 61 to generate an airflow (correction airflow) to suppress the estimated disturbance of the airflow. More simply, controller 37 may suppress the disturbance of the airflow by increasing the air volume (suction volume) of suction fan 61 when the action of droplet expulsion is detected.

As described above, airflow control system 10 can suppress the disturbance of the airflow in interior space 70 and can thus continuously form the airflow close to the predetermined airflow in interior space 70. Therefore, airflow control system 10 can suppress dispersion of droplets in interior space 70 by maintaining the suction of air by airflow generation device 60.

[Other Variations]

In the above embodiment, the walking action and the action of droplet expulsion are exemplified as specific actions, but specific actions are not limited to such actions. For example, a specific action may be, for example, a person fanning oneself or another person with a hand fan.

Airflow control system 10 may also detect several types of specific actions. For example, airflow control system 10 including airflow generation device 40 may control airflow generation device 40 to suppress a disturbance of the airflow when any of a walking action, an action of droplet expulsion, and a fanning action with a hand fan is detected.

Effects, Etc.

As described above, airflow control system 10 includes: obtainer 34 that obtains image data of interior space 50 (or interior space 70) in which an airflow is formed by airflow generation device 40 and a person is located; identifier 35 that identifies skeletal coordinates of the person based on the image data obtained; estimator 36 that estimates a movement of the person based on time-series data of the skeletal coordinates identified; and controller 37 that controls airflow generation device 40 (or airflow generation device 60) to suppress a disturbance of the airflow caused by the movement of the person estimated.

Airflow control system 10 described above can suppress the disturbance of the airflow in interior space 50. In other words, airflow control system 10 can maintain the airflow formed in the interior space.

For example, estimator 36 detects a specific action of the person by estimating the movement of the person. When the specific action is detected, controller 37 controls airflow generation device 40 to suppress a disturbance of the airflow caused by the specific action.

Airflow control system 10 described above can suppress the disturbance of the airflow caused by the specific action.

For example, the specific action is a walking action.

Airflow control system 10 described above can suppress the disturbance of the airflow caused by the walking action.

For example, the specific action is an action of droplet expulsion.

Airflow control system 10 described above can suppress the disturbance of the airflow caused by the action of droplet expulsion.

For example, obtainer 34 obtains the image data of an image captured by an infrared camera.

Airflow control system 10 described above can identify the skeletal coordinates of the person even when interior space 50 is dark based on the image data of the image captured by the infrared camera.

An airflow control method to be executed by a computer such as airflow control system 10 includes: obtaining image data of interior space 50 in which an airflow is formed by airflow generation device 40 and a person is located; identifying skeletal coordinates of the person based on the image data obtained; estimating a movement of the person based on time-series data of the skeletal coordinates identified; and controlling airflow generation device 40 to suppress a disturbance of the airflow caused by the movement of the person estimated.

Such an airflow control method can suppress the disturbance of the airflow in interior space 50. In other words, the airflow control method can maintain the airflow formed in the interior space.

Other Embodiments

The airflow control system and the airflow control method according to the embodiment have been described above, but the present invention is not limited to the above embodiment.

In the above embodiment, the airflow control system is implemented by the plurality of devices, but the airflow control system may be implemented as a single device. For example, the airflow control system may be implemented as a single device corresponding to the control device. When the airflow control system is implemented by a plurality of devices, the elements of the airflow control system may be assigned to the plurality of devices in any way.

In the above embodiment, other processors may execute the processes described to be executed by the specific processors. Moreover, the executing order of the plurality of processes may be changed, or some of the processes may be executed in parallel.

Each of the elements in the above embodiment may be realized by executing a software program suitable for the element. Each of the elements may be realized by means of a program executing unit, such as a CPU or a processor, reading and executing the software program recorded on a recording medium such as a hard disk or a semiconductor memory.

Each of the elements may be configured in the form of a hardware product. For example, each of the elements may be a circuit (or an integrated circuit). These circuits may constitute one circuit as a whole or may be separate circuits. These circuits may each be a general-purpose circuit or a dedicated circuit.

The general or specific aspects of the present invention may be implemented using a system, a device, a method, an integrated circuit, a computer program, or a computer-readable recording medium such as a CD-ROM, or any combination of systems, devices, methods, integrated circuits, computer programs, and recording media. For example, the present invention may be implemented as a program for causing a computer to execute the airflow control method according to the above embodiment or as a non-transitory computer-readable recording medium on which such a program is stored.

Forms obtained by making various modifications to each of the above embodiments that can be conceived by those skilled in the art, or forms obtained by combining the structural components and the functions in the embodiments, without materially departing from the spirit of the present invention, may be included in the scope of the present invention.

REFERENCE SIGNS LIST

10 Airflow control system
20 Camera
30 Control device
31 Communicator
32 Information processor
33 Storage
34 Obtainer
35 Identifier
36 Estimator
37 Controller
40, 60 Airflow generation device
41 Blower fan
42, 62 Louver
50, 70 Interior space 61 Suction fan
63 Main body
63a Suction port
63b Discharge port

The invention claimed is:

1. An airflow control system comprising:
an obtainer that obtains image data of an interior space in which an airflow is formed by an airflow generation device and a person is located;
an identifier that identifies skeletal coordinates of the person, based on the image data obtained;
an estimator that estimates a movement of the person based on time-series data of the skeletal coordinates identified; and
a controller that controls the airflow generation device to suppress a disturbance of the airflow caused by the movement of the person estimated.

2. The airflow control system according to claim 1, wherein the estimator detects a specific action of the person by estimating the movement of the person, and when the specific action is detected, the controller controls the airflow generation device to suppress a disturbance of the airflow caused by the specific action.

3. The airflow control system according to claim 2, wherein the specific action is a walking action.

4. The airflow control system according to claim 2, wherein the specific action is an action of droplet expulsion.

5. The airflow control system according to claim 1, wherein the obtainer obtains the image data of an image captured by an infrared camera.

6. An airflow control method comprising:
obtaining image data of an interior space in which an airflow is formed by an airflow generation device and a person is located;
identifying skeletal coordinates of the person based on the image data obtained;
estimating a movement of the person based on time-series data of the skeletal coordinates identified; and
controlling the airflow generation device to suppress a disturbance of the airflow caused by the movement of the person estimated.

7. A non-transitory computer-readable recording medium having recorded thereon a program for causing a computer to execute the airflow control method according to claim 6.

* * * * *